United States Patent
Chen

(10) Patent No.: US 7,609,962 B2
(45) Date of Patent: Oct. 27, 2009

(54) CAMERA SOCKET AND METHOD FOR MAKING THE SAME

(75) Inventor: Chia-Hua Chen, Tu-Cheng (TW)

(73) Assignee: FIH (Hong Kong) Limited, Kowloon (HK)

( * ) Notice: Subject to any disclaimer, the term of this patent is extended or adjusted under 35 U.S.C. 154(b) by 559 days.

(21) Appl. No.: 11/401,088

(22) Filed: Apr. 10, 2006

(65) Prior Publication Data
US 2006/0280500 A1    Dec. 14, 2006

(30) Foreign Application Priority Data
Jun. 10, 2005    (CN) .................. 2005 1 0035302

(51) Int. Cl.
*G03B 17/02* (2006.01)
*H04N 5/225* (2006.01)
*G02B 7/02* (2006.01)

(52) U.S. Cl. .................. 396/535; 396/529; 348/373; 359/808

(58) Field of Classification Search ................. 396/535, 396/419, 424, 529, 533; 348/340, 373, 374; 359/808, 819; 257/678, 680; 250/363.02, 250/370.08, 559.05, 559.07, 559.08, 559.46; 438/7, 69
See application file for complete search history.

(56) References Cited

U.S. PATENT DOCUMENTS 6,541,284 B2 *    4/2003   Lam .............................. 438/7

* cited by examiner

*Primary Examiner*—Rochelle-Ann J Blackman
(74) *Attorney, Agent, or Firm*—Steven M. Reiss

(57) ABSTRACT

A camera socket (100) includes a base (10) and a film (12). The base defines a receiving cavity (14) for receiving a camera module therein. The base has a transparent section (106) aligned with lenses of the camera module. The film is formed on a surface of the base. A portion (120) of the film formed on the transparent section of the base is transparent, the other portion of the film is coated with a metal coating (122). The metal coating is opaque, and the metal coating can be made of aluminum, copper, nickel, and stainless steel. The base is made of transparent plastic such as polycarbonate or polymethyl methacrylate. The present invention also provides a method for making the housing.

18 Claims, 4 Drawing Sheets

CAMERA SOCKET AND METHOD FOR MAKING THE SAME

BACKGROUND OF THE INVENTION

1. Field of the Invention

The present invention generally relates to cameras and, more particularly, to a camera socket for holding a camera module and to a method for making the camera socket.

2. Discussion of the Related Art

With the development of wireless communication and information processing technologies, portable electronic devices such as mobile phones, and personal digital assistants (PDAs) are now in widespread use. These electronic devices enable consumers to enjoy high technology services anytime and anywhere. Currently, digital camera modules are included as a feature in a wide variety of portable electronic devices.

Referring to FIG. 4, a typical digital camera module 400 includes a lens module 50 and a lens holder 40. The lens holder 40 includes a base 41 and a lens barrel 42. A screw thread 422 is formed inside of the lens barrel 42, and another screw thread 52 is correspondingly formed on outside of the lens module 50. In assembly, the lens module 50 is installed into the lens barrel 42 by the cooperation of the screw threads 52 and 422.

However, electro-magnetic interference (EMI) problems can occur when the digital camera module 400 is used in a portable electronic device, because of the electro-magnetic signal of the portable electronic device. The electro-magnetic interference problems can affect the image quality of the camera module 400.

Therefore, a camera socket for holding camera modules is desired in order to overcome the above-described problems.

SUMMARY OF THE INVENTION

In one aspect, a camera socket includes a base and a film. The base defines a receiving cavity for receiving a camera module therein. The base has a transparent section aligned with lenses of the camera module. The film is formed on a surface of the base. A portion of the film formed on the transparent section of the base is transparent, and the other portion of the film is coated with a metal coating.

In another aspect, a method for making a camera socket includes the steps of: providing a film, the film having a transparent portion; covering the transparent portion of the film with a mask; forming a metal coating on a surface of the film; removing the mask; placing the film in a mold; and forming a base integrating with the film in the mold; wherein the base defines a receiving cavity, the base having a transparent section aligned with lenses of a camera module, and the transparent portion of the film is formed on the transparent section of base.

Other advantages and novel features will become more apparent from the following detailed description when taken in conjunction with the accompanying drawings.

BRIEF DESCRIPTION OF THE DRAWINGS

Many aspects of the camera socket can be better understood with reference to the following drawings. The components in the drawings are not necessarily drawn to scale, the emphasis instead being placed upon clearly illustrating the principles of the present camera socket. Moreover, in the drawings, like reference numerals designate corresponding parts throughout the several views.

DETAILED DESCRIPTION OF THE EMBODIMENTS

Figure 1:
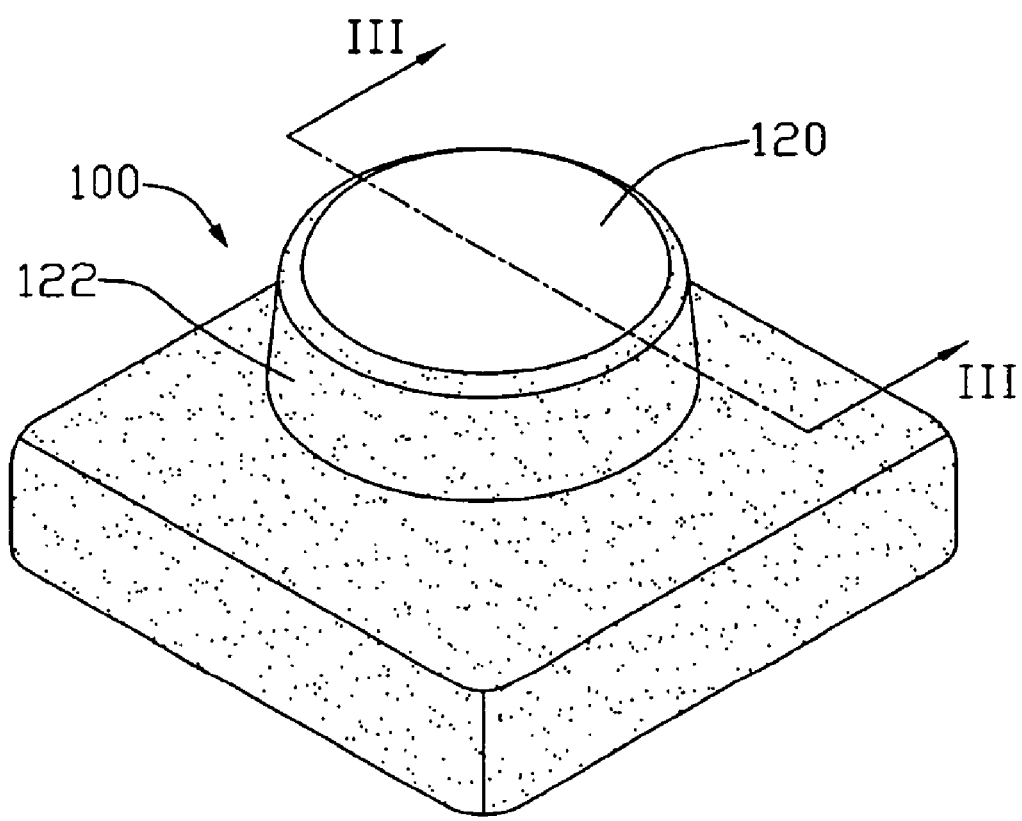
FIG. 1 is a schematic view of a camera socket in accordance with a preferred embodiment.
Figure 3:
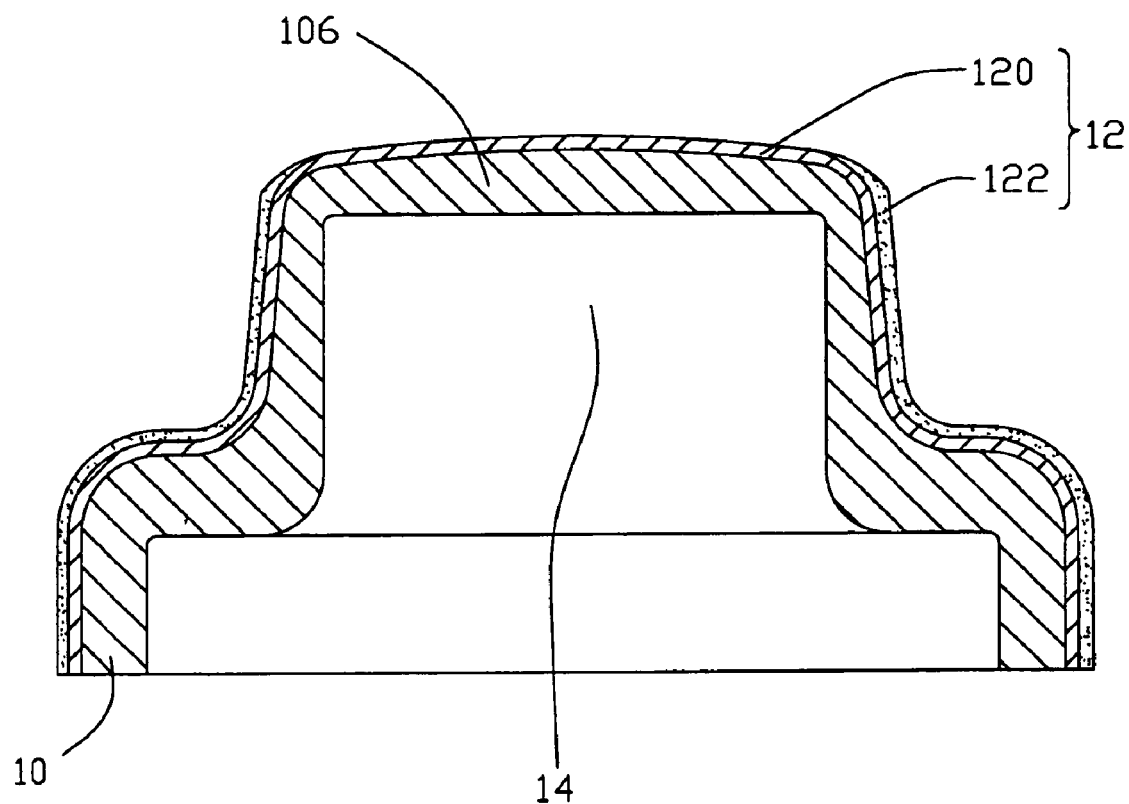
FIG. 3 is a cross-sectional view of the camera socket along line III-III in FIG. 1.
Figure 4:
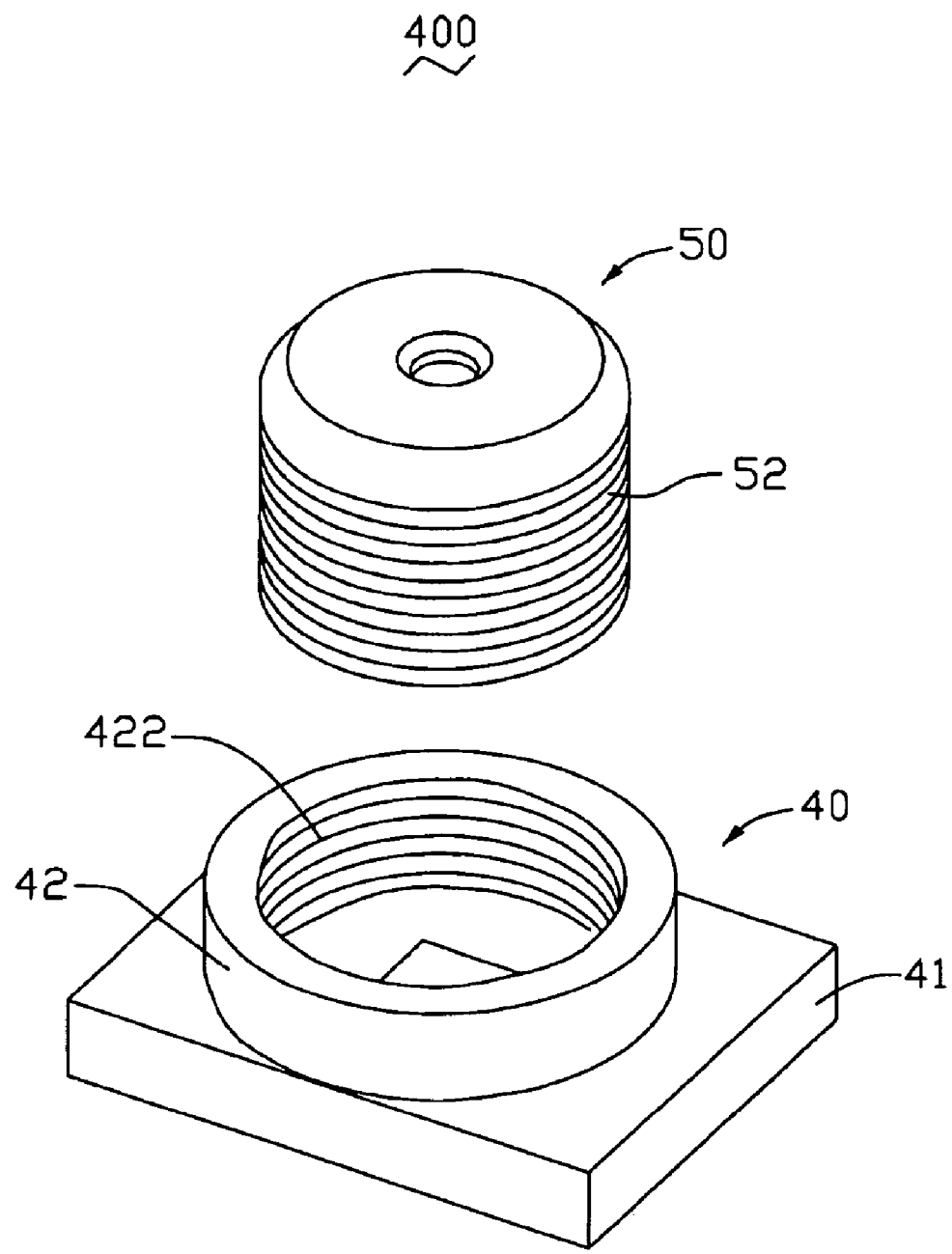
FIG. 4 is an exploded, isometric view of a digital camera module from the prior art.

Referring to FIGS. 1 and 3, in a preferred embodiment, a camera socket 100 includes a base 10 and a film 12 integrally formed on a surface of the base 10. The base 10 defines a cap-like receiving cavity 14.

The base 10 includes a top portion 106. The film 12 includes a transparent portion 120 and a metal coating portion 122. The transparent portion 120 of the film 12 is formed on the top portion 106 of the base 10, and the metal coating portion 122 is formed on the other portion of the base 10. The base 10 may be made of a transparent plastic material. The transparent plastic material can be polycarbonate, polymethyl methacrylate, or any desired combination thereof. The metal coating portion 120 is deposited with a metal coating, and the metal coating can be made of an opaque material, such as aluminum, copper, nickel, or stainless steel.

In use, the camera socket 100 covers a camera module of a portable electronic device in its receiving cavity 14. The metal coating can make the camera module avoid the electro-magnetic interference (EMI) from outside or inside of the portable electronic device. Furthermore, the camera socket 100 can also protect the camera module from damage or contamination.

Figure 2:
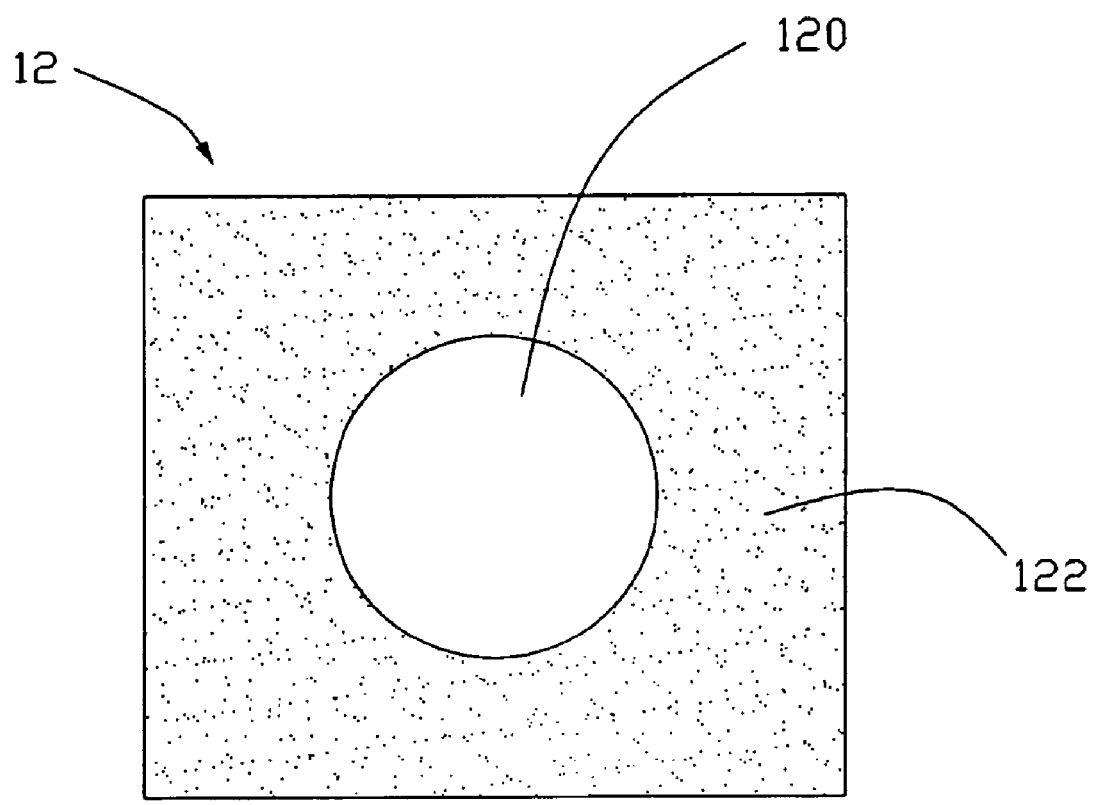
FIG. 2 is a schematic view of the film in FIG. 1.

Referring to FIGS. 2-3, an exemplary method for making the camera socket 100 is provided. Firstly, a film 12 is provided. The film 12 may be either soft or flexible. The film 12 has a transparent portion 120. Secondly, the transparent portion 120 of the film 12 is covered by means of a mask (not shown). Thirdly, a metal coating is formed on the surface of the film 12 by vacuum vapor deposition or electroplating. The metal coating can be made of an opaque material, such as aluminum, copper, nickel, or stainless steel. Fourthly, the masking is removed, and the transparent portion 120 of the film is still transparent as it is not coated with metal coating 122. Fifthly, the film 12 is placed in a mold, and a base 10 is integrally formed together with the film 10 in the mold. The base 10 is made of a transparent plastic, such as polycarbonate, or polymethyl methacrylate. The transparent portion 120 of the film 12 is formed on the top potion 106 of the base 10. Thereby, a camera socket 100 for a camera module is obtained.

It is believed that the present embodiments and their advantages will be understood from the foregoing description, and it will be apparent that various changes may be made thereto without departing from the spirit and scope of the invention or sacrificing all of its material advantages, the examples here before described merely being preferred or exemplary embodiments of the invention.

What is claimed is:

1. A camera socket, comprising:

a base defining a receiving cavity, the receiving cavity being configured for receiving a camera module therein, the base having a transparent section aligned with lenses of the camera module; and a film formed on a surface of the base;

wherein a portion of the film formed on the transparent section of the base is transparent, and the other portion of the film is coated with a metal coating.

2. The camera socket as claimed in claim 1, wherein the metal coating is opaque.

3. The camera socket as claimed in claim 1, wherein the metal coating is made of a material selected from the group consisting of aluminum, copper, nickel, and stainless steel.

4. The camera socket as claimed in claim 1, wherein the base is made of transparent plastic.

5. The camera socket as claimed in claim 4, wherein the transparent plastic is polycarbonate or polymethyl methacrylate.

6. The camera socket as claimed in claim 1, wherein the receiving cavity is a cap-like space.

7. A method for making a camera socket, comprising the steps of:
providing a film having opposite first and second film surfaces, the film having a transparent portion;
forming a metal coating on the first film surface other than the transparent portion; and
forming a base integrating with the second film surface;
wherein the base defines a receiving cavity, the base having a transparent section aligned with the transparent portion of the film.

8. The method as claimed in claim 7, wherein the metal coating is opaque.

9. The method as claimed in claim 7, wherein the metal coating is made of a material selected from the group consisting of aluminum, copper, nickel, and stainless steel.

10. The method as claimed in claim 7, wherein the base is made of transparent plastic.

11. The method as claimed in claim 10, wherein the transparent plastic is polycarbonate or polymethyl methacrylate.

12. The method as claimed in claim 7, comprising the steps of covering the transparent portion of the film with a mask before the step of forming the metal coating and removing the mask after the step of forming the metal coating.

13. The method as claimed in claim 12, wherein forming the metal coating is done by one of vacuum vapor deposition and electroplating.

14. The method as claimed in claim 7, wherein the base is integrated with the film by molding.

15. A camera socket, comprising:
a base defining a receiving cavity, the receiving cavity being configured for receiving a camera module therein, the base having a transparent section aligned with lenses of the camera module; and
a film formed on a surface of the base, the film comprising a transparent first portion covering the transparent section of the base and a second portion coated with a metal coating.

16. The method as claimed in claim 15, wherein the base is made of transparent plastic.

17. The method as claimed in claim 16, wherein the transparent plastic is polycarbonate or polymethyl methacrylate.

18. The camera socket as claimed in claim 15, wherein the receiving cavity is a cap-like space.

* * * * *

UNITED STATES PATENT AND TRADEMARK OFFICE
CERTIFICATE OF CORRECTION

PATENT NO.         : 7,609,962 B2                                          Page 1 of 1
APPLICATION NO.   : 11/401088
DATED              : October 27, 2009
INVENTOR(S)        : Chia-Hua Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 755 days.

Signed and Sealed this

Twelfth Day of October, 2010

David J. Kappos
*Director of the United States Patent and Trademark Office*